United States Patent [19]

Hsu

[11] Patent Number: 4,721,556
[45] Date of Patent: Jan. 26, 1988

[54] ELECTROCHEMICAL CONVERTERS AND COMBINED CYCLE SYSTEMS

[76] Inventor: Michael S. Hsu, Roundhill Rd., Lincoln, Mass. 01773

[21] Appl. No.: 861,433

[22] Filed: May 9, 1986

Related U.S. Application Data

[63] Continuation-in-part of Ser. No. 735,441, May 17, 1985, Pat. No. 4,629,537.

[51] Int. Cl.[4] .................. C25B 9/00; C25B 9/04; H01M 2/08; B05D 5/06
[52] U.S. Cl. .................. 204/258; 204/279; 204/290 R; 204/270; 429/35; 428/167; 428/446
[58] Field of Search .................. 29/623.1; 429/34–37; 156/89; 204/253–258, 267–270, 279; 428/65, 167, 446

[56] References Cited

U.S. PATENT DOCUMENTS

| | | | |
|---|---|---|---|
| 3,394,032 | 7/1968 | Danner | 204/301 X |
| 3,432,353 | 3/1969 | Von Krusenstierna et al. | 429/39 |
| 3,460,991 | 8/1969 | White | 429/30 |
| 3,505,114 | 4/1970 | Rohr | 429/32 |
| 3,526,548 | 9/1970 | Accorsi et al. | 429/38 X |
| 3,526,549 | 9/1970 | Archer et al. | 429/32 |
| 3,554,808 | 1/1970 | Fischer et al. | 429/32 |
| 3,607,427 | 9/1971 | White | 204/129 X |
| 3,616,334 | 10/1971 | Aker et al. | 204/129 |
| 4,042,483 | 8/1977 | Bouy et al. | 204/290 F |
| 4,056,452 | 11/1977 | Campbell | 204/258 |
| 4,197,362 | 4/1980 | Schmidberger et al. | 429/12 |
| 4,210,512 | 7/1980 | Lawrance et al. | 204/257 |
| 4,478,918 | 10/1984 | Ueno et al. | 429/36 X |
| 4,490,444 | 12/1984 | Isenberg | 429/31 |
| 4,490,445 | 12/1984 | Hsu | 429/32 |

OTHER PUBLICATIONS

Westinghouse Electric Corp., Annual Report Covering the Period, Apr. 1, 1978 to Mar. 31, 1979, Apr. 30, 1979, pp. 3–5.

Argonne National Laboratory, Advanced Fuel Cell Development Progress Report for Apr.–Jun. 1983, excerpts.

*Primary Examiner*—Donald R. Valentine
*Attorney, Agent, or Firm*—Thomas J. Engellenner

[57] ABSTRACT

A compact, electrochemical converter can be achieved using thin plates of electrolyte and interconnector. Impermeable, straight, thin plates of solid-oxide electrolyte are fabricated by high energy plasma spray methods under controlled temperature conditions. Thin sheets of nickel alloys or silicon carbide or platinum alloys can be used to form the interconnector. The electrolyte and interconnector plates can be assembled into a converter stack at an elevated temperature such that upon cooling and during subsequent operational temperature excursions, the electrolyte plates will remain in compression. The stacks can be connected together to form modules which can be used as stand-alone electricity generators or used in combined cycle, cogeneration and gasifier systems.

21 Claims, 11 Drawing Figures

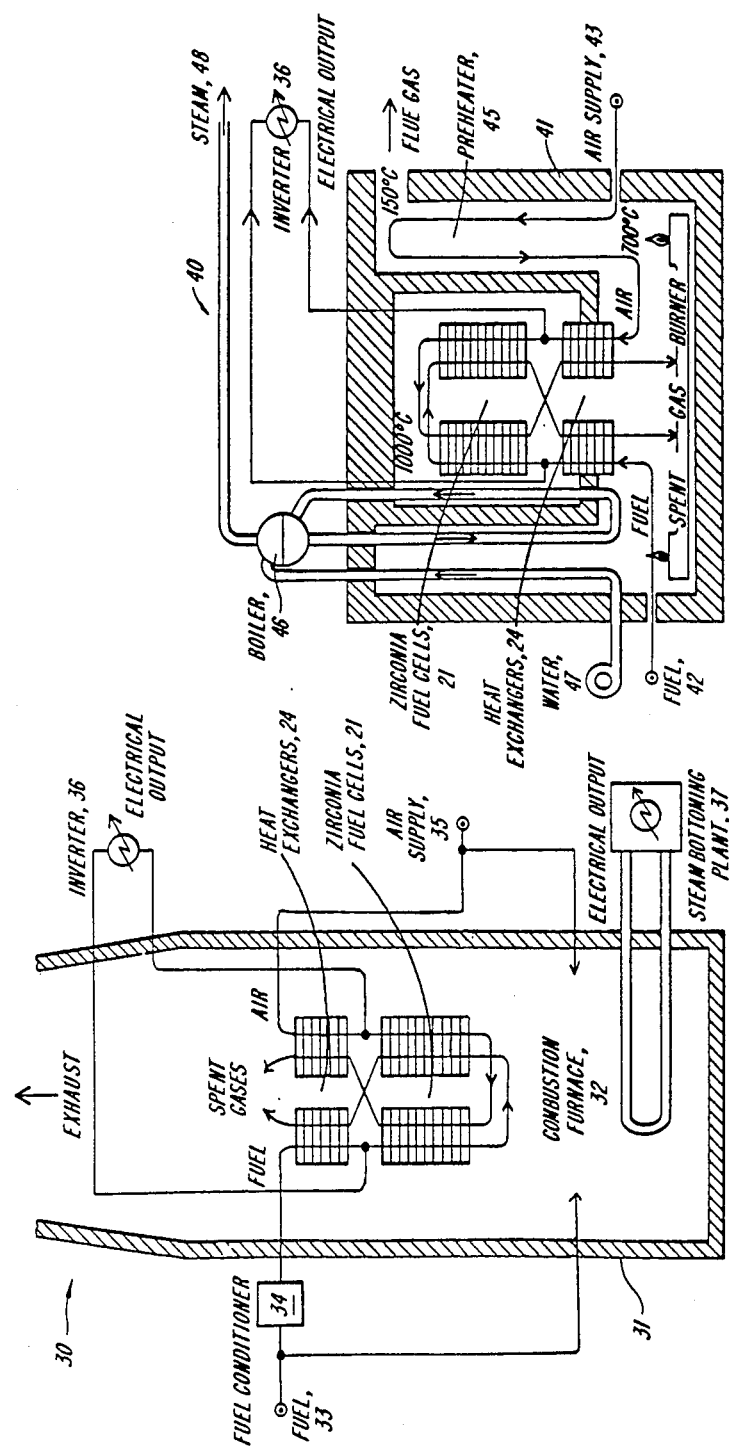

ELECTROCHEMICAL CONVERTERS AND COMBINED CYCLE SYSTEMS

REFERENCE TO RELATED APPLICATIONS

This application is a continuation-in-part of application Ser. No. 735,441 filed May 17, 1985 now U.S. Pat. No. 4,629,537.

BACKGROUND OF THE INVENTION

This invention relates to electrochemical converters employing solid oxide electrolytes and methods for making the same as well as systems employing such devices and methods.

Electrochemical converters perform fuel-to-electricity conversions in a fuel cell (electric generator) mode of electricity-to-fuel conversions in an electrolyzer (fuel synthesizer) mode. The converters are capable of high efficiencies, depending only on the relation between the free energy and enthalpy of the electrochemical reaction and are not limited by Carnot-cycle considerations.

The key components in an electrochemical energy converter are a series an electrolyte units onto which electrodes are applied and a similar series of interconnectors disposed between the electrolyte units to provide serial electrical connections. Each electrolyte unit is an ionic conductor with low ionic resistance allowing the transport of an ionic species from one electrode-electrolyte interface to the opposite electrode-electrolyte interface under the operating conditions of the converter. Is is known that zirconia stabilized with such compounds as magnesia, calcia or yttria can satisfy these requirements when operating at high temperature (about 1000° C.). This material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface which requires that the electrodes be sufficiently porous to admit the reacting gas species and to permit exit of product species.

Solid oxide devices formed in hollow tubular configurations are known. See, for example, U.S. Pat. No. 3,460,991 issued to D. W. White, Jr. on Aug. 12, 1969. Work on such tubular solid-oxide electrolytes also was reported in a publication *Thin Film Fuel Cell/Battery Power Generating System* (Westinghouse R&D Center 1979). The electrolyte, electrodes and interconnector components disclosed in this work were fabricated using electrochemical vapor deposition (EVD) and layer masking techniques. Additionally, a monolithic honeycomb design was disclosed in a publication *Advanced Fuel Cell Development* (Argonne National Laboratory 1983). The Argonne Laboratory work employed casting and isostatic forming techniques followed by high-temperature fusion of the components to form a converter.

These prior art approaches have demanded materials having equal thermal expansion coefficients to assure mechanical integrity throughout the temperature excursions encountered in fabrication and usage. This integrity requirement over a wide temperature range has imposed severe restrictions on material selections and consequently in the methods of fabrication.

The concept and approach of forming the components as free-standing plates to circumvent the thermal/structural integrity problem was disclosed by the present inventor in U.S. Pat. No. 4,490,445, issued Dec. 25, 1984, herein incorporated by reference.

There exists a need for compact, efficient converters that are easier to manufacture and more economical in use. In particular, an electrochemical converter employing free-standing plates and having an improved power-to-weight ratio (or power-to-volume ratio) would satisfy a long felt need in the industry. Moreover, robust electrochemical converters capable of withstanding high operating temperatures and severe environments such as those which exist within a combustion furnace or the like would also satisfy a long felt need.

SUMMARY OF THE INVENTION

Compact and efficient electrochemical converters can be formed from thin structural components designed to optimize conversion efficiency. In accordance with this invention, flat plates of the solid-oxide electrolytes and interconnectors are used. Plasma-spray techniques are used to produce impermeable, straight, free-standing thin electrolyte plates. Preferably the electrolyte plates are formed on a reusable, separable substrate. Substrate materials with high temperature properties and low interface holding strength such as graphite have been found to be particularly suitable. In one aspect of the invention the impermeable properties of the plate are obtained by a high power plasma-spray proces. The straightness of the plates preferably is controlled by maintaining an isothermal condition across the substrate surface throughout the fabrication process. Methods for uniform and constant temperature control are described below. For the purposes of this invention, the term "high power" is used to define plasma-spraying techniques wherein an electrolyte powder is passed through an arc discharge of at least about 30 kilowatts, preferably about 50 kilowatts or greater, to generate a plasma spray. It has been found that when solid oxide electrolyte plates are formed from such a high power plasma, plates with thickness on order of 50 to 750 microns with less than 25 microns out-of-plane distortion, can be formed while maintaining high impermeability to hydrogen and other fuel gases. It has also been found that a high power plasma allows the formation of plates that can be more easily sintered to high densities (i.e., over 90 percent of theoretical material density).

In another aspect of the invention, interconnector plates with corrugated patterns, providing passages for the distribution of reactants, are disclosed. The plates are formed from metals that optimize the weight and energy conversion requirements. Ease of fabrication, together with high strength and good chemical resistance at high temperatures characterize the preferred interconnector materials. Nickel alloy sheets of about 200 to 500 microns have been found suitable. To assure the electrical continuity of the interconnector in high temperature oxidizing environments, thin coatings (i.e., 10 microns or less) of gold, silver or platinum are preferred on the contact points when nickel alloys are used. High temperature and long duration tests have demonstrated the durability and stability of such contact coatings. Stamping and deposition techniques are disclosed to form the corrugated patterns of the interconnector plates. Silicon carbide is also a very attractive material for construction of the interconnector plates. Silicon carbide has a very low specific density of about 3.1 g/cm$^3$ and very low hydrogen permeability. Silicon carbide plates of about 50 to 300 microns thickness have been found suitable. Platinum alloys have also been found to be strong and non-reactive in the operating temperature range. Platinum alloy sheets of about 25 to 250 microns thickness have been found suitable in terms of thermal/mechanical and permeation criteria.

In another aspect of the invention a method of assembly for the electrolyte and interconnector plates of the electrochemical converter is disclosed in which the assembly is conducted at an elevated temperature in order to take advantage of the mismatch of thermal expansion coefficients between the electrolyte and the interconnector plates. By assembling the stack at an elevated temperature, the electrolyte plates can be "prestressed". Preferably the stack is assembled at a temperature higher than the operating requirements. For example, with zirconia electrolytes the stack is preferably assembled at a temperature of about 800° C. or higher and, most preferably, at a temperature of about 1000° C. or higher. After the plates have been fused together and the assembly is cooled, the electrolyte plates experience in-plane compression due to their lower thermal expansion compared to the adjacent interconnectors. During subsequent operating excursions at temperatures below the assembly temperature, the electrolyte will remain in compression, a favorable stress state for ceramic materials.

In one preferred embodiment, the electrochemical converters of the present invention can be paired to form hairpin pendants with U bends to achieve better structural rigidity and more convenient one-sided terminations for gas manifolding and electrical connections. Bus bars are provided to tap or supply electricity to the electrochemical pendants in multiple parallel connections. A heat exchanger can also be provided to serve as a thermal conduction buffer and preheat incoming gasses with a counter flow scheme.

In yet another aspect of the invention, electrochemical converters can be used in various combined cycle systems to generate electricity in conjunction with other thermodynamic processes. In one embodiment, fuel cells can be employed in a combustion-fired steam bottoming plant using oil, gas or coal as an added source of electricity, thereby increasing overall conversion efficiency. In another embodiment, a combustion-fired cogeneration system is disclosed in which fuel cells generate electricity within an industrial steam boiler. A third embodiment is disclosed in which a fuel cell is disposed within a coal gasifier to generate electricity from the coal-derived fuel gas.

The invention will next be described in connection with certain preferred embodiments. However, it should be clear that various changes and modifications can be made by those skilled in the art without departing from the spirit or scope of the invention. For example, although the electrolyte-interconnector stacks are shown in a schematic tubular, columnar configuration, such stacks can also have a square or rectangular outer shape. Additionally, other solid materials which have good oxygen transport properties can be used in lieu of zirconia to form the electrolyte plates.

BRIEF DESCRIPTION OF THE DRAWINGS

FIG. 9 is a schematic illustration of a steam powered electricity generating system incorporating an electrochemical converter module according to the invention.

FIG. 10 is a schematic illustration of a co-generation system incorporating an electrochemical converter module according to the invention.

DETAILED DESCRIPTION

Figure 1:
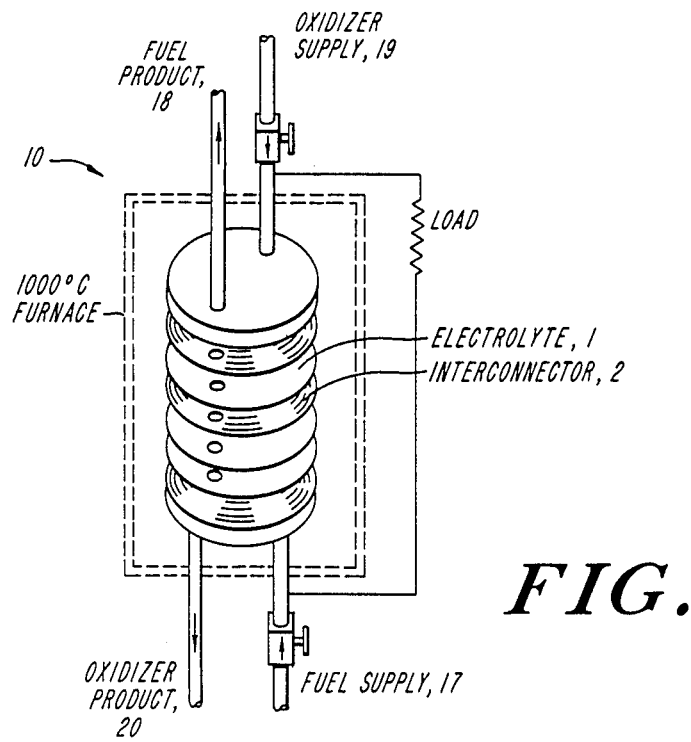
FIG. 1 is a simplified view of an electrochemical energy converter utilizing components fabricated according to the invention.

In FIG. 1, an electrochemical converter 10 employing the compact, lightweight components of the present invention is shown consisting of alternating electrolyte plates 1 and interconnector plates 2. Holes through the plates form the passages for fuel and oxidizer gases. Grooves in the interconnector plates facilitate the distribution and collection of the gases. The cell stacks can be assembled in compression or by fusion thereby maintaining the electrical contacts and gas seals.

Figure 2:
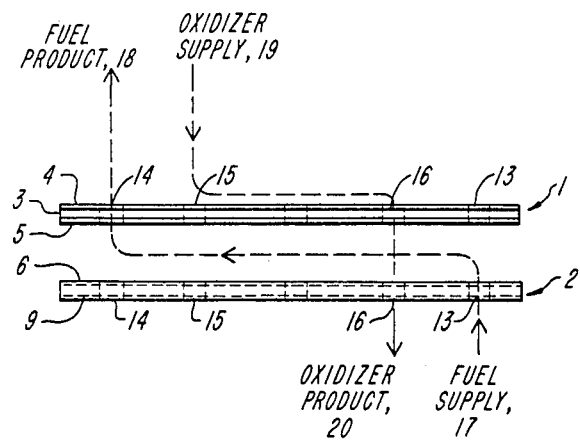
FIG. 2 is a cross-sectional view of an electrolyte component and an interconnector component of an electrochemical cell stack fabricated according to the invention.
Figure 3:
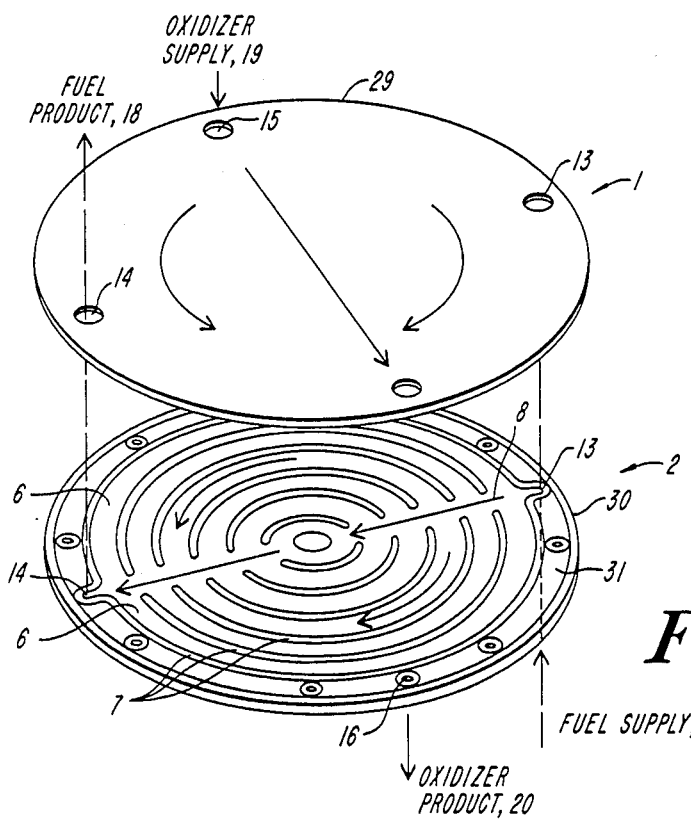
FIG. 3 is a more detailed isometric view of the electrolyte and interconnector component fabricated according to the invention.

In FIGS. 2 and 3, the basic cell unit in the electrochemical cell stack is shown comprising a single electrolyte plate 1, and a single interconnector plate 2. The electrolyte plate 1 can be made of stabilized zirconia $ZrO_2(Y_2O_3)$ material 3, on which a porous oxidizer electrode 4 and a porous fuel electrode 5 are coated. Preferred materials for the oxidizer electrodes are perovskites such as $LaMnO_3(Sr)$. Preferred materials for fuel electrodes are cermets such as $ZrO_2/Ni$. The interconnector plate 2 preferably is made of a metal such as Inconel, a nickel alloy or a platinum alloy or made of a non-metallic conductor, such as silicon carbide. It serves as the electric connector between adjacent electrolyte plates and as a partition between the fuel and oxidizer gases as well as providing a heat conduction path along the electrode surfaces 4, 5 and to the outer edges of the plates 1 and 2.

Fuel can be supplied to the cell stack through an axial (with respect to the stack) manifold 17 coupled to the stack via holes 13 and the fuel product is exhausted through manifold 18 via holes 14. The fuel is distributed over the fuel electrode surface 5 through an in-plane groove network 6 formed in the upper surface of the interconnector plate 2. The notches 8 made in ridges 7 provide openings into the groove network 6 connecting holes 13 and 14 at the surface of each fuel electrode 5. The oxidizer is fed to the stack from manifold 19 via holes 15 and its product is exhausted through manifold 20 via holes 16. The oxidizer is distributed over the oxidizer electrode surface of the next electrolyte plate through a complementary in-plane groove network 9 formed in the lower surface of the conductor plate 2. A similar network on the lower surface of the adjacent cell above provides the passages for the oxidizer along electrolyte plate 1 as shown in FIG. 3. The outer ridges of the groove networks 6 and 9 on the interconnector plates 2 are brought in contact with electrolyte plates 1 to form the sealed outer walls of stack assembly. The ridges 7 are pressed against the electrodes in assembly to achieve electrical contacts. The stack can be secured by water-cooled tension rods (not shown) which are disposed in bolt holes 12 to provide the assembly force.

It is to be understood that the apparatus related to this invention can be utilized as a fuel cell (electric generator) when gaseous fuel is supplied or be applied as an electrolyzer (fuel synthesizer) when electricity is applied. It is applicable to all reversible reactions involving exchanging of oxygen such as:

$$H_2 + \tfrac{1}{2}O_2 = H_2O$$

$$SO_2 + \tfrac{1}{2}O_2 = SO_3$$

$$CO + \tfrac{1}{2}O_2 = CO_2$$

and $$NH_3 + 5/4\ O_2 = NO + 3/2\ H_2O$$

To achieve compact, lightweight and efficient devices, components with thin structure are desired. The volumetric power density ($P_v$) of the planar cell stack is determined by the surface power density ($P_s$) of the electrolyte and the geometrical factors. The relationship can be represented by the equation:

$$P_v = P_s \cdot V/S$$

where S is the height of a cell unit in a planar stack and V is the volumetric packaging efficiency. For an assembly of planar cell stack with a modest $P_s$ of 0.2 W/cm$^2$, and V of 0.7, $P_v$ equals 1.0 W/cm$^3$ or 1000 kW/m$^3$ when S, the unit cell height, is 0.15 cm or 1500 μm. The cell unit height S, is determined by the sum of the thicknesses of the electrolyte and interconnector plates.

The thin electrolyte plates of this invention can be prepared using a high energy plasma-spray technique. For example, a powder comprising zirconia stabilized with magnesia, calcia or yttria is first suspended in a working gas such as nitrogen or argon and the suspension then is passed through an arc discharge. The oxide particles are heated by the discharged gas to their molten state and ejected from a nozzle onto a substrate, which has a surface corresponding to the desired configuration of the final electrolyte plate. The arc discharge is typically at least about 30 kilowatts, preferably at least 50 kilowatts to generate a high energy plasma spray.

It has been found that a suitable high energy plasma spray can be generated employing an arc discharge having a voltage of at least 30 volts and a current of at least 800 amperes. Such a plasma spray can be generated by a variety of commercial devices, such as the Bay State Plasma Spray System manufactured by Bay State Abrasives, a Division of Dresser Industries, Inc., Westborough, Mass. Preferably, the oxide powders used in plasma spray process should have a mean particle size ranging from about 40 to about 100 microns and the spray rate can range from 2 to about 8 pounds per hour.

Figure 4:
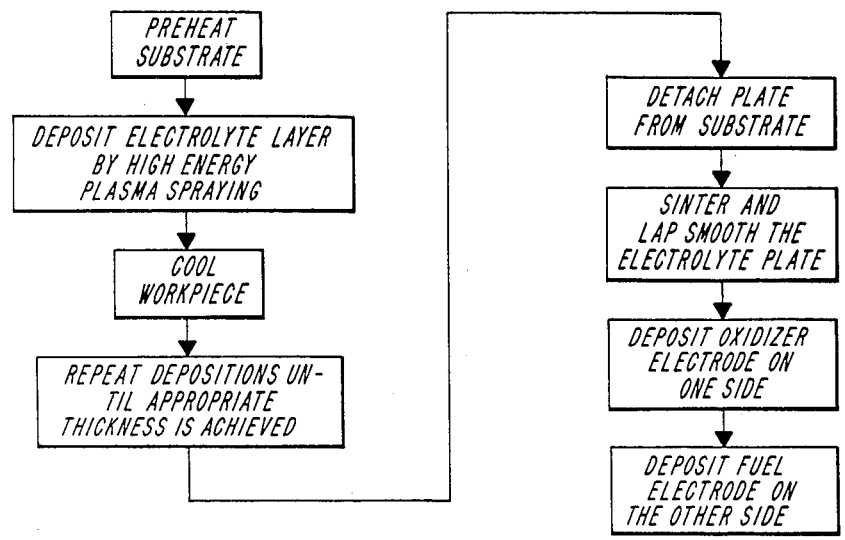
FIG. 4 is a schematic block diagram of the electrolyte fabrication process according to the invention.

In FIG. 4, a block diagram is presented of an electrolyte plate manufacturing process according to the invention. The process begins with a substrate, preferably a substrate with proper adhesion with the solid oxide to be deposited. The substrate allows particles to adhere until a continuous coating of the desired thickness is obtained while permitting subsequent removal of the electrolyte plate by thermal of mechanical means without fracturing. For example, a suitable substrate surface can be achieved with graphite. Generally, the degree of roughness which is desired is between about 2.5 microns and about 25 microns finish. The substrate is preferably preheated to about 150° C.–300° C. prior to the commencement of oxide deposition.

As noted above, the solid oxide electrolyte is deposited onto the substrate by a high energy plasma spray. In one embodiment, the plate is obtained by a multiple step deposition process. For example, when the temperature of the substrate exceeds about 250° C., spraying is interrupted and the workpiece (substrate) is allowed to cool, typically to about 230° C. The electrolyte plates can be cooled during the deposition process, for example, by passing a coolant through the substrate or by passing a non-reactive gas over the plate between the deposition of each layer. Once the workpiece is sufficiently cooled, another layer is deposited. This process is continued until a plate of sufficient thickness (e.g., 50 to 750 microns) is obtained. Alternatively, the plate can be formed by a continuous deposition process in which the substrate and/or plate are continuously cooled to maintain a constant temperature during deposition. The plate can be detached from the substrate by a mechanical impact or thermal quenching to induce sufficient stress at the interface to overcome the adhesion between the plate and substrate. The plate is typically sintered next at about 1400° C. to 1600° C. to further densify the electrolyte material. The solid-oxide plate obtained by the multiple step spraying process has a density approaching about 90% theoretical density. During sintering, the solid-oxide plate experiences a linear shrinkage of about 2% which results in a product approaching about 96% theoretical density.

After sintering, the plates are lapped slightly to produce a smooth surface and then a fuel electrode and oxidizer electrode are deposited on opposite sides of each plate, for example, by a flame deposition technique or a slurry application technique which produces coatings of a desired porosity of about 30–40 percent.

Figure 5:
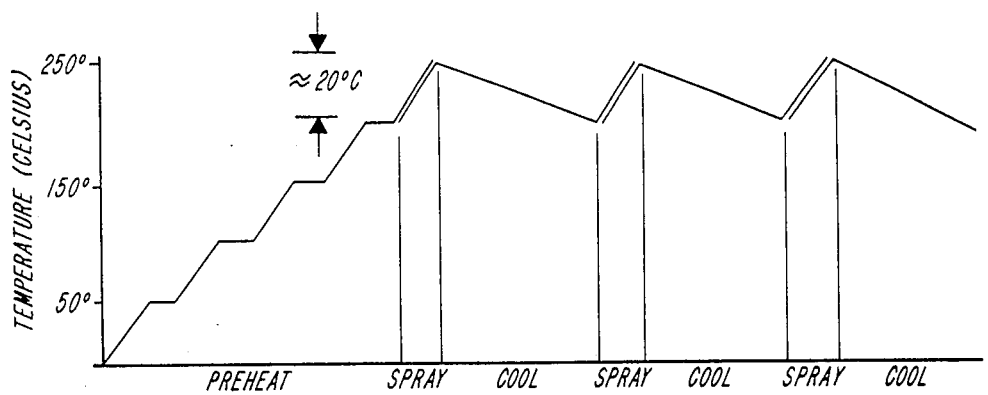
FIG. 5 is a graph of temperature and deposition conditions over time for an electrolyte fabrication process according to the invention.

In FIG. 5, the spray deposition process of the invention is further illustrated by a graph which plots temperature and the spray operation over time. Preheating can be conveniently achieved by impinging hot gas on the substrate using the plasma spray gas without the oxide powder. The interim cooling steps can be accomplished by natural convection, forcing a non-reactive room temperature gas over the workpiece or by a coolant circulating network integrated into the substrate.

The preferred materials for the thin interconnector plates of this invention were selected based on the following requirements: (1) strength as well as electrical and thermal conductivity were necessary at 1000° C., which is the operating temperature of the converter; (2) good oxidation resistance was also necessary up to the working temperature; (3) chemical stability with fuel species was required; and (4) manufacturing economy when formed into the corrugated plate configuration, likewise was needed.

Three types of materials, nickel and platinum alloys and silicon carbide were found to be most suitable. The relevant material properties are listed below in Table I.

TABLE I
INTERCONNECTOR PROPERTIES

|  | Nickel Alloy | Platinum Alloy | Silicon Carbide |
|---|---|---|---|
| DENSITY (g/cm$^3$) | 8.17 | 21.5 | 3.1 |
| HEAT CAPACITY (J/g °C.) | 0.46 | 0.2 | 1.4 |
| THERMAL CONDUCTIVITY (W/cm °C.) | 0.173 | 0.72 | 0.4 |
| THERMAL EXPANSION COEFFICIENT (1/ °C.) | $1.7 \times 10^{-5}$ | $0.8 \times 10^{-5}$ | $0.4 \times 10^{-5}$ |
| TENSILE STRENGTH AT 1000° C. (kPa) | 7,000 | 70,000 | 170,000 |
| ELECTRIC CONDUCTIVITY (mho/cm) | $3 \times 10^4$ | $2 \times 10^4$ | 10 |
| HYDROGEN PERMEATION (cm$^2$/sec) | $10^{-3}$ | $10^{-4}$ | — |

It has been found that nickel alloys of 200 to 500 microns thickness, platinum alloys of 25 to 150 microns and silicon carbide of 50 to 300 microns can be applied to form corrugated plates of 1000 microns in height. The corrugated interconnectors exhibit excellent stiffness in spite of thin materials. Silicon carbide is virtually impermeable to hydrogen and is stable to oxidation even at high temperature. The permeation of hydrogen through the metallic interconnectors is limited to a small portion of the fuel consumption rate. Nickel, which forms a thin, protective, and insulative coating in an oxidation environment, requires thin (10 microns or less) coatings such as silver, gold, or platinum on contact surfaces.

Figure 6:
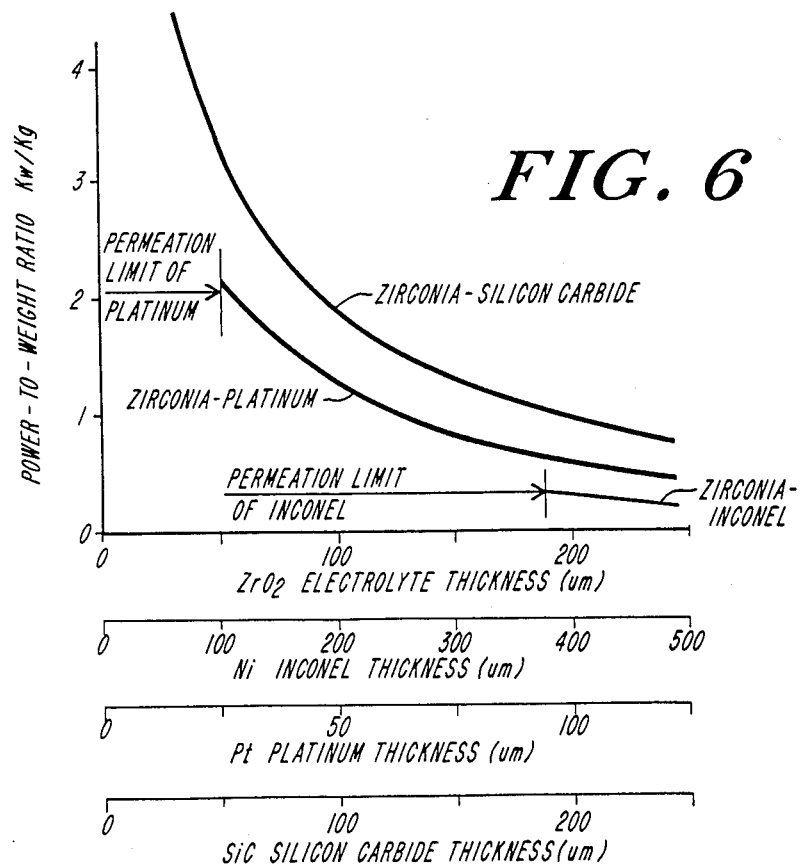
FIG. 6 shows the relationship of the power-to-weight ratio to the thickness of the electrolyte and interconnector components fabricated according to the invention.

Results of a weight analysis are presented in FIG. 6. The study selected the electrolyte thickness as a variable. Based on thermal and structural requirements, a nickel interconnector having a thickness twice that of the electrolyte was selected; the platinum interconnector thickness was chosen to be about one half that of the electrolyte and the silicon interconnector is preferably equal to the electrolyte plate thickness. The power-to-weight ratio of an unpackaged system, excluding the insulation enclosure, heat exchanger or piping, was computed. For example, as shown in the figure, devices of better than 2000 W/kg of an unpackaged weight, can be achieved with silicon carbide or plantinum interconnectors. The nickel system can achieve 350 W/kg.

The corrugated top and bottom patterns of the interconnectors can be obtained, for example, by stamping the nickel or plantinum alloy sheets with one or more sets of matched male and female dies. The dies are prefabricated according to the desired configuration of the product, and can be hardened by heat treatment to withstand the repetitive compressing actions in mass productions. The stamp forming process for the interconnector preferably is conducted in multiple steps due to the geometrical complexity of the gas passage networks. For example, grooves are formed in initial strokes, which are followed by notch forming to provide gas cross-flow passages. Holes in the interconnectors are punched out at the final step. Temperature annealling is recommended between the consecutive steps to prevent the overstressing of sheet metal. The stamping method is capable of producing articles of complex geometry while maintaining uniform material thickness. Alternatively, corrugated interconnectors can be formed by electrodeposition on an initially flat metal plate using a set of suitable masks. Silicon carbide interconnector plates can be formed by vapor deposition onto preshaped substrates, by sintering of bonded powders, or by self bonding processes.

Figure 7:
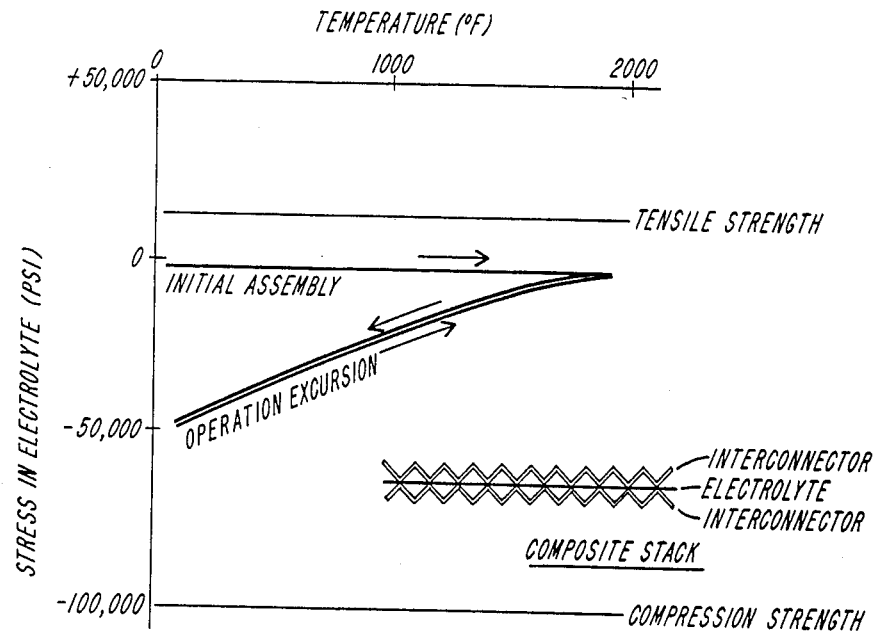
FIG. 7 is a graph of temperature versus stress experienced by an electrolyte plate during assembly according to the invention.

The converter stacks of the present invention are preferably assembled at a high temperature which serves not only to fuse the adjacent plates together (and thereby achieve gas sealing and electrical contact) but also places the electrolyte plates in a favorable prestressed position. This technique is most useful when metallic interconnector plates are disposed between the zirconia electrolyte plates since it takes advantage of the large differences in their respective thermal expansion coefficients. FIG. 7 shows the stress changes which will occur in a typical zirconia electrolyte during high temperature assembly. The stack is preferably assembled at a temperature above 1000° C. and fusion of adjacent plates is achieved by a metallic flux (e.g. nickel powder) coated the ridges of plates. After the plates have been fused together and the assembly is cooled, the electrolyte plates experience in-plane compression. During operational excursions, as shown in FIG. 7, the electrolyte will remain in compression, a favorable stress slate for ceramic materials.

Figure 8:
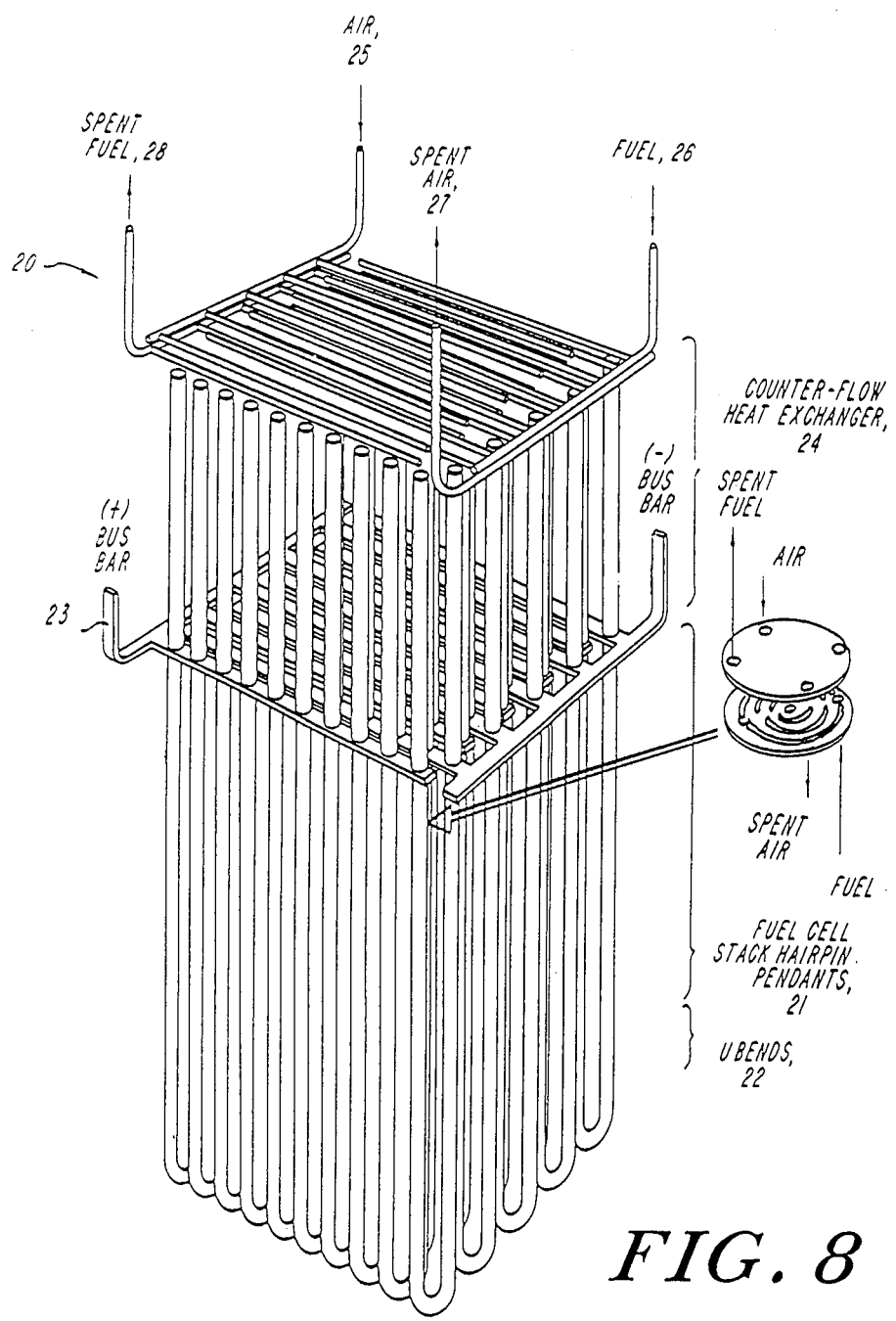
FIG. 8 is a schematic, isometric view of an electrochemical converter module useful in systems according to the invention.

In FIG. 8 an electrochemical converter module 20 is shown having stacked electrolyte and interconnector plates as its components. In general, the structures and configurations shown in FIG. 8 are similar to those described in U.S. Pat. No. 4,490,445 cited above and incorporated by reference. The module 20 includes hairpin pendants 21 with U bends 22 to achieve better structural rigidity and more convenient one-side terminations for gas manifolding and electrical connections. Bus bars 23 are provided to tap or supply electricity to the electrochemical pendant stacks 21 which are in multiple parallel electrical connection. The module 20 is designed to operate efficiently at an elevated temperature (about 1,000 degrees C.). Heat exchanger stacks 24 are provided and serve as a thermal conduction buffer between the hot electrochemical cell stacks 21 and the incoming gases. In the illustrated embodiment, the incoming reaction gases is heated by the outgoing spent product gases in a counterflow scheme similar to that described in U.S. Pat. No. 4,490,445. The heat exchanger stack 24 can be constructed from flat heat exchanger plates which are arranged in alternating layers with partition plates. Internal passages for the feeding and exhausting of gases and grove networks for the distribution of gases over the heat exchanger plates can be provided substantially identical to the grove and ridge patterns described above in connection with the plates of the electrochemical converter. Similarly, ridges on the heated partition plates can be pressed against the adjacent heat exchanger plates to provide circumferential gas seals.

In FIG. 9 a module such as that described in FIG. 8 is shown incorporated in a fossil fuel-fired, electricity-generating system 30. Electrochemical fuel cells 21 and heat exchangers 24 (preferably in a modular configuration as shown in FIG. 8) are disposed within the combustion chamber 31. Within the chamber 31 a combustion furnace burns fuel 33 and air 35 to generate steam. Energy is extracted from the steam in a steam bottoming plant 37 to provide an electrical output. At the same time, a portion of the fuel supply 33 is conditioned by a fuel conditioner 34 and fed via the heat exchangers 34 to the electrochemical (fuel cell) converter 21. A portion of the air supply 35 is similarly passed through the heat exchanger 24 and into the converter for reaction with the fuel therein. The electrical output of the converter is transferred to an inverter 36 to generate an alternating current electrical output. The spent gases from the fuel cell are fed into the combustion furnace for further extraction of thermodynamic energy. The converter produces electricity at about 1000° C. by an exothermic process due to the electrochemical characteristics of the reactions and the internal resistance. The heat is convectively transferred to the combustion reactants which flow by the converter, which reactants in turn generate steam in subsequent sections of the flow duct. This system offers efficient energy coupling, economic mechanical intergration, and high efficiency in conversion of fuel to electricity, not limited to Carnot cycle constraints.

FIG. 10 shows a steam-cogeneration system useful, for example, in generating steam for industrial or residential uses, which also incorporates an electrochemical converter within the combustion chamber 41. In this configuration, fuel supply 42 is first fed via heat exchangers 24 into the converter 21 and air from air supply 43 is likewise fed through the exchangers 24 into the converter 21. As in FIG. 9, the electricity generated by the converter is converted to alternating current electrical output by converter 36. In this cogeneration system 40 the converter again produces electricity at about 1000° C. by an exothermic process. However, in this system the heat is radiantly transferred to water tubes distributed within the furnace. Steam is generated in the water tubes and collected in the boiler drum 46. The spent gases from the converter are also burned within the combustion chamber 41 to provide additional energy necessary to generate further steam 48 from water 47 in boiler 46. This steam can be used directly in industrial applications for various processes or can be used for example, in residential or commercial applications for heating or the like.

Figure 11:
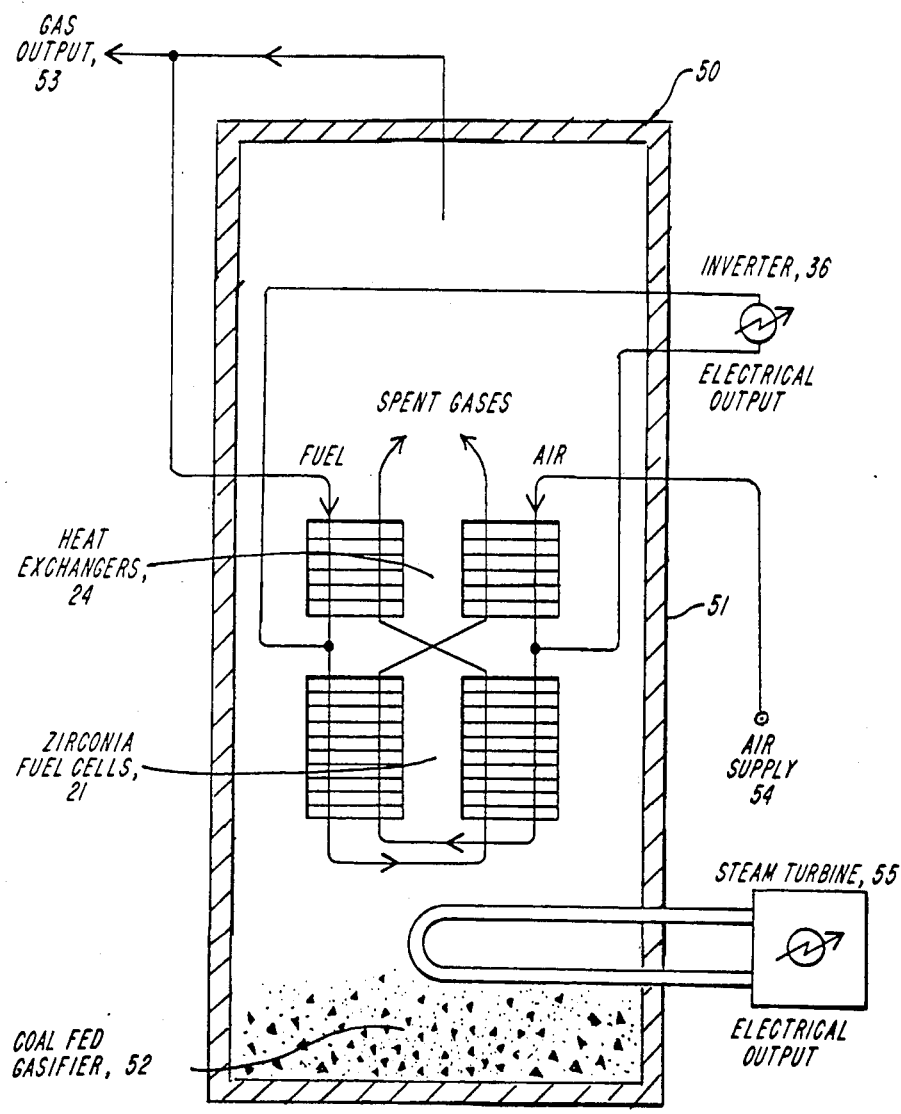
FIG. 11 is a schematic illustration of a coal gasification system incorporating an electrochemical converter module according to the invention.

In FIG. 11 a coal gasification system 50 is shown which incorporates the electrochemical modules of the present invention. Again, the converter cells 21 and heat exchanger 23 are disposed within a combustion chamber 51. Within this chamber, a coal-fed gasifier 52 converts coal into gas. A portion or the total of this gas output is fed into the converter 21 via the heat exchanger 24 while air from air supply 54 is also provided. Again, the electrical output of the converter is transferred to the inverter 36 to provide alternating current electrical output. As shown, the heat generated within the gasifier can also be used by a steam turbine 55 to provide an additional electrical output.

What is claimed is:

1. A method of constructing an electrochemical converter, the method comprising:
   (a) forming a set of solid-oxide electrolyte plates by suspending a solid oxide powder in a gas, generating a plasma spray from the gas suspension, depositing the solid oxide upon a substrate until plates of about 50 to about 750 microns in thickness are deposited, and then removing the plates from the substrate;
   (b) coating said electrolyte plates with a fuel electrode material on one surface of each plate and an oxidizer electrode material on a second surface of each plate;
   (c) forming a set of interconnector plates having corrugated structures, comprising at least one material chosen from the group of nickel alloys, silicon carbide and platinum alloys, the plate having thickness ranging from about 100 to about 1000 microns in the case of nickel alloy, and having a thickness ranging from about 50 to 300 microns in the case of silicon carbide and having a thickness ranging from about 25 to about 250 microns in the case of platinum alloys, the corrugated structure defining groove networks for the passage of gases and ridges for gas seals and electrical contact with the electrode coatings of the electrolyte plates; and
   (d) assembling the converter by stacking alternating layers of the electrolyte and interconnector plates together and subjecting the stack to an elevated temperature to fuse the adjacent plates to each other such that the interconnectors undergo substantially greater thermal expansion in comparison with the electrolyte plates at said elevated assembly temperature, and whereby upon cooling the electrolyte plates will experience in-plane compression.

2. The method of claim 1 wherein the step of assembly further comprises assembling the stack at a temperature of about 800° C. or higher.

3. The method of claim 1 wherein the step of assembly further comprises assembling the stack at a temperature of about 1000° C. or higher.

4. The method of claim 1 wherein the step of assembly further comprises fusing the adjacent plates together at a high temperature.

5. The method of claim 4 wherein a flux material is employed to achieve fusion of the adjacent plates.

6. A method of forming an interconnector plate for use in an electrochemical convertor, the interconnector plate serving to provide electrical connection between an oxidizer electrode of a first electrolyte disposed on one side of the interconnector plate and a fuel electrode of a second electrolyte disposed on the other side of the interconnector plate, the plate also serving to isolate and distribute separate reactant gases over the oxidizer and fuel electrodes of the first and second electrolytes, the method comprising
   (a) forming a plate from a silicon carbide composite having a thickness of the plate ranging from about 50 to about 300 microns;
   (b) defining a corrugated pattern of ridges and grooves on one side of the plate to permit the isolation and distribution of a first reactant gas on the one side;
   (c) defining a complementary corrugated pattern of ridges and grooves on the other side of the plate to permit the isolation and distribution of a second reactant gas on the other side; and
   (d) providing holes for introduction of the first reactant gas onto the one side and for the introduction of the second reactant gas onto the other side.

7. The method of claim 6 wherein the corrugated patterns are defined by silicon carbide deposition on a preshaped substrate.

8. The method of claim 6 wherein the corrugated patterns are defined by molding and then sintering a silicon carbide compact.

9. An interconnector plate for use in an electrochemical converter, the interconnector plate serving to provide electrical connection between an oxidizer electrode of a first electrolyte disposed on one side of the interconnector plate and a fuel electrode of a second electrolyte disposed on the other side of the interconnector plate, the plate also serving to isolate and distribute separate reactant gases over the oxidizer and fuel electrodes of the first and second electrolytes, the interconnector plate being forming from a silicon carbide, the thickness of the silicon carbide plate ranging from about 50 to 300 microns; the plate having a corrugated pattern of ridges and grooves on one side thereof to permit the isolation and distribution of a first reactant gas on the one side and a complementary corrugated pattern of ridges and grooves on the other side of the plate to permit the isolation and distribution of a second reactant gas on the other side; and holes for introduction of the first reactant gas onto the one side and for the introduction of the second reactant gas onto the other side.

10. An electrochemcial converter comprising:
(a) a set of solid-oxide electrolyte plates formed by suspending a solid oxide powder in a gas, passing the suspension through an arc discharge to generate a plasma spray and deposit the solid oxide until plates of about 50 to about 750 microns in thickness are deposited, removing the plates from the substrate; and then coating said electrolyte plates with a fuel electrode material on one surface of each plate and an oxidizer electrode material on a second surface of each plate; and
(b) a set of interconnector plates having corrugated structures, comprising at least one material chosen from the group of platinum and nickel alloys and silicon carbide composites, the metal plate having a thickness ranging from about 100 to about 1000 microns in the case of nickel alloy, having a thickness ranging from about 50 to 300 microns in the case of silicon carbide, and having a thickness ranging from about 25 to about 250 microns in the case of platinum alloys, the corrugated structure defining groove networks for the passage of gases and ridges for gas seals and electrical contact with the electrode coatings of the electrolyte plates said interconnector plates having a greater coefficient of thermal expansion than said electrolyte plates;
wherein the converter is assembled by stacking alternating layers of the electrolyte and interconnector plates together at an elevated assembly temperature to fuse the adjacent plates to each other such that upon cooling the electrolyte plates experience in-plane compression.

11. An electricity generating system comprising
a. a fossil fuel-fired steam power plant including a boiler having a combustion furnace;
b. the electrochemical converter of claim 10 disposed within the combustion furnace of said power plant, and
c. a fuel supply connected to the converter to provide a source of fuel for electrochemical conversion and connected to said furnace to provide a source of fuel for generation of steam from water in said boiler.

12. The system of claim 11 wherein heat from the converter is transferred to flow-by combustion reactants by convection to generate additional steam.

13. The system of claim 11 wherein the fuel is gas.

14. The system of claim 13 wherein the fuel supply further includes a reformer producing hydrogen and carbon monoxide from said gas.

15. The system of claim 11 wherein partially spent fuel from the electrocal converter is released to the combustion furnace of said power plant.

16. The system of claim 11 wherein the fuel is oil and the fuel supply includes a converter for converting the oil into gas prior to its introduction into the electrochemical converter.

17. The system of claim 11 wherein the fuel is coal and the fuel supply further includes a coal gasifier for converting the coal into gas prior its introduction into the electrochemical converter.

18. A cogeneration system comprising
a. a boiler having a combustion furnace to generate steam, thereby providing energy for at least one external process;
b. the electrochemical converter of claim 10 disposed within the combustion furnace of said boiler; and
c. a fuel supply connected to the converter to provide a source of fuel for electrochemical conversion and connected to said furnace to provide a source of fuel to generate steam from water in the boiler.

19. The system of claim 18 wherein heat from the converter is transferred to water tubes within the furnace by radiation to generate steam.

20. The system of claim 18 wherein partially spent fuel from the converter is released to the combustion furnace of said boiler.

21. A coal gasification system comprising
a. a coal-fed gasifier having a chamber in which coal is converted into a combustible gas;
b. the electrochemical converter of claim 10 disposed within the chamber of said gasifier; and
c. means for supplying at least a portion of said combustible gas from said gasifier to said converter as a fuel for electrochemical conversion.

* * * * *